June 9, 1925.
F. C. THIESZ
RIM FOR VEHICLE WHEELS
Filed Dec. 13, 1924
1,541,445
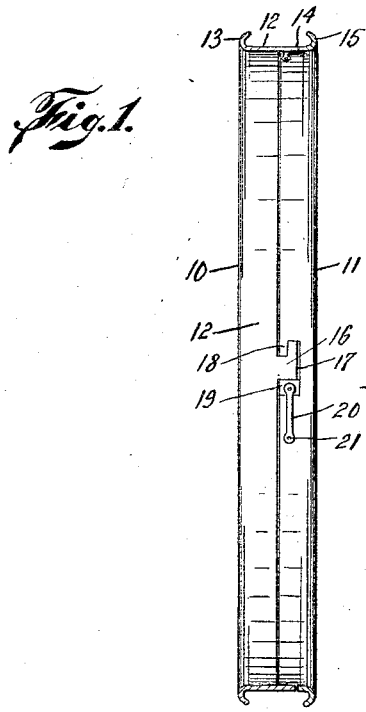
Fig.1.
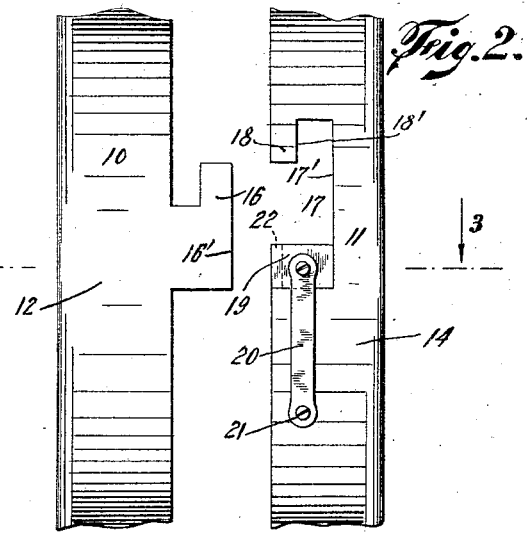
Fig.2.
Fig.3.
INVENTOR
F. C. Thiesz
BY
Sigmund Herzog
ATTORNEY Patented June 9, 1925.

1,541,445

UNITED STATES PATENT OFFICE.

FRANK C. THIESZ, OF JERSEY CITY, NEW JERSEY.

RIM FOR VEHICLE WHEELS.

Application filed December 13, 1924. Serial No. 755,690.

*To all whom it may concern:*

Be it known that I, FRANK C. THIESZ, a citizen of the United States, and resident of Jersey City, in the county of Hudson and State of New Jersey, have invented certain new and useful Improvements in Rims for Vehicle Wheels, of which the following is a specification.

The present invention relates to vehicle wheels adapted to receive tires, solid or pneumatic, and more particularly to rims which are detachable so as to facilitate replacement of deflated tires.

Demountable rims for vehicle wheels have been in common use, but more or less difficulty is encountered in applying and removing the tire to and from such rim, although the rims are easily applicable to the wheel structure. The present invention is designed to enable unskilled persons to easily and quickly apply and remove the tire from the rim.

The main objects of the invention are to simplify the structure as well as the means and mode of operation of such devices, whereby they will not only be cheapened in construction, but will be more efficient in use, easily and quickly applied, secure in their engagement and unlikely to get out of order.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a transverse section taken through a demountable rim constructed in accordance with the present invention; Fig. 2 is a plan view of a portion of said rim, on a larger scale, the parts being separated; and Fig. 3 is a section taken on line 3—3 of Fig. 2.

The demountable tire rim comprises an annular channel, which is divided circumferentially into two sections 10 and 11. The section 10 comprises a base ring 12, provided with a peripheral marginal flange 13. The section 11 comprises also a base ring, denoted by the numeral 14, said base ring having a peripheral marginal flange 15. The flanges 13 and 15 may be of any suitable shape or contour, to agree with the type of tire to be engaged. A plurality of equidistantly spaced hooks 16 project outwardly from the inner edge of the base ring 12. A plurality of equidistantly spaced notches 17 are formed in the free edge of the base ring 14, their number corresponding to that of the hooks 16 on the base ring 12. Into each notch 17 projects a lug 18, adapted to interlock with the respective hook 16 to securely lock the rim sections together against lateral movement. In each notch 17 is disposed, in opposition to the lug 18, a locking tongue 19, carried by a blade spring 20, the latter being secured at 21 to the inner face of the base ring 14. Each of these tongues is provided with a beveled edge 22, in alignment with the free edge of the base ring 14, for a purpose hereinafter to be described. As appears from Figs. 1 and 2 of the drawings, each of the notches 17 is of a size corresponding to that of a hook 16 plus a locking tongue 19.

In Figs. 2 and 3 of the drawings the two separable rim sections are shown in positions whereby the hooks 16 are adapted to enter the notches 17. As the two rim sections are moved one toward another, the hooks 16 force the locking tongues 19 inwardly out of the notches 17, thereby permitting the outer edges 16' of the hooks to engage the edges 17' of the notches 17. When the two rim sections are in these positions, the rim section 10 is turned until the bills of the hooks engage throughout their length the edges 18' of the lugs 18, the springs 20 forcing then the tongues 19 back into the notches 17, whereby the two rim sections are securely locked both against transverse and circumferential movement.

In separating the rim sections, the tongues 19 are forced inwards to permit of relative rotary movement of the two sections, until the bills of the hooks 16 clear the lugs 18, to allow the two rim sections to be shifted laterally.

The outer edges of the tongues 19 are beveled to permit the hooks to automatically force the same out of the notches 17, when the two rim sections are engaged with one another.

It is obvious that only one tongue 19 need be used on a wheel.

What I claim is:

A demountable rim comprising two flanged ring sections, one of said ring sections being provided with a plurality of equidistantly spaced notches in its inner edge, a lug projecting into each notch adjacent the inner edge of the respective ring section, a plurality of equidistantly spaced hooks on the inner edge of the other ring section, the bills of said hooks being adapted to engage said lugs, when said hooks are seated in said notches, by rotating one of said ring sections relatively to the other, whereby said ring sections are secured against lateral movement, and a spring-pressed tongue in one of said notches, adapted to abut against the respective hook to prevent circumferential movement of one of said ring sections in relation to the other, the outer edge of said tongue being beveled to permit said tongue to be forced out of its notch when the respective hook is being seated in said notch.

Signed at New York, in the county of New York, and State of New York, this 11th day of December, A. D. 1924.

FRANK C. THIESZ.